Patented July 26, 1927.

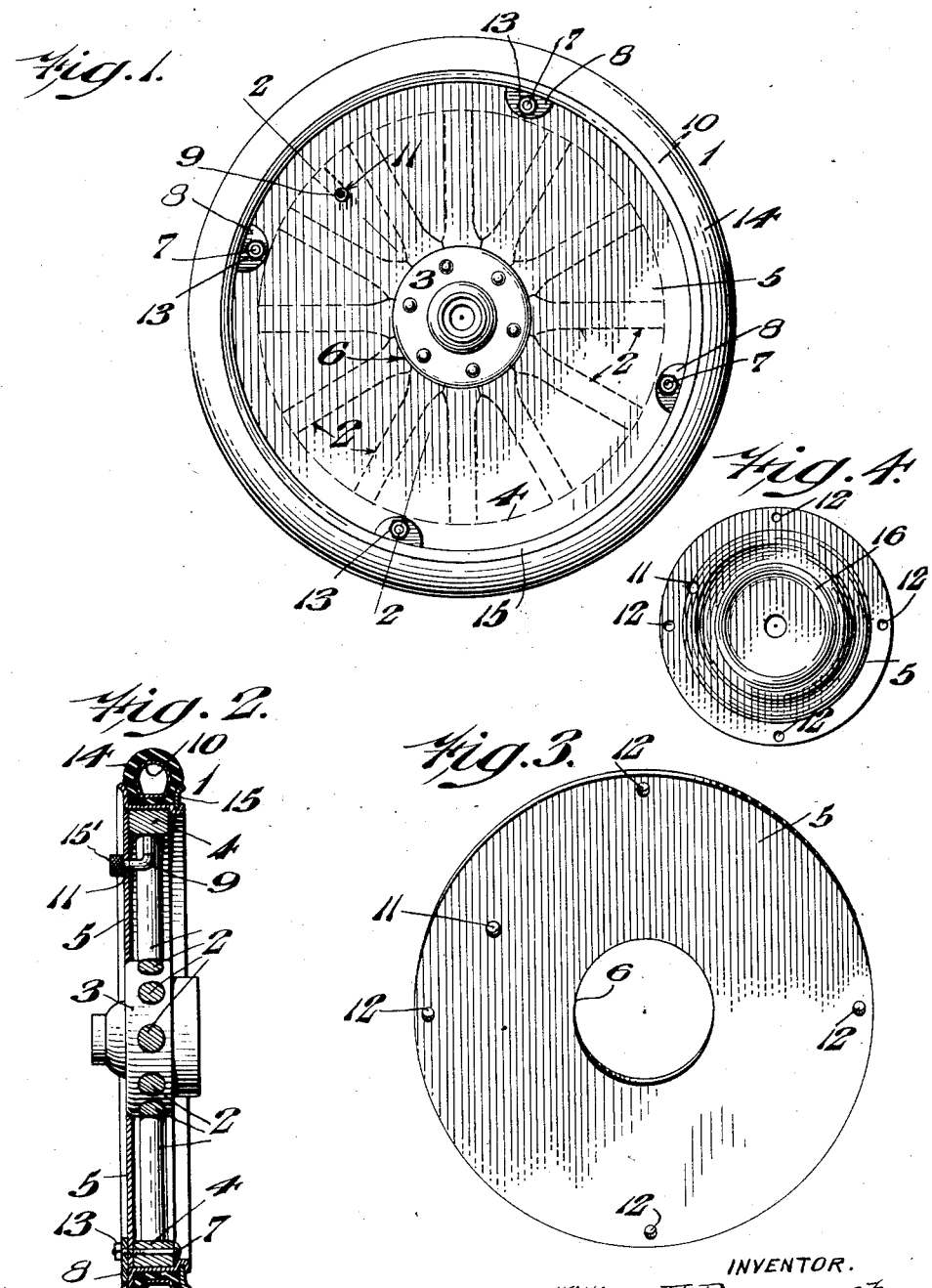

1,637,160

UNITED STATES PATENT OFFICE.

WILLIAM H. RAPEFORT, OF PHILADELPHIA, PENNSYLVANIA.

WHEEL CONSTRUCTION FOR MOTOR VEHICLES.

Application filed August 22, 1925. Serial No. 51,762.

This invention generally stated relates to motor vehicles and has more especial relation to the provision of shields or plates for one side of a vehicle wheel and to cover and protect the spokes thereof, which may be said to be one object of the present invention.

A further object of the present invention is to provide a device of the character stated which is of simple, durable and comparatively inexpensive construction which may be expeditiously attached and is adapted for detachable engagement with the felly of a motor vehicle wheel.

Other and further objects not at this time more particularly pointed out will be hereinafter referred to.

The invention consists of the novel features hereinafter described and finally claimed.

The nature, characteristic features and scope of the invention will be more fully understood from the following description taken in connection with the accompanying drawings forming part thereof and in which Figure 1 represents a side elevation of a motor vehicle wheel having applied thereto a disc or plate embodying the present invention.

Figure 2 represents a vertical section taken upon the line 2—2, Figure 1.

Figure 3 represents a disc or plate of the present invention, in perspective and Figure 4 is a face view of the disc or plate of the present invention showing the slightly modified form of the invention.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail the reference numeral 1 designates a motor vehicle wheel of the type known as an artillery wheel provided with conventional spokes 2, an outer hub 3 and felly 4. The reference numeral 5 designates a disc or plate of thin metal, for instance, sheet metal, which has an unbroken outer periphery which fits snugly against the felly and within the outer edge of the tire rim is circumferentially apertured as at 12, see Figure 3, is centrally apertured as at 6, and is provided with an additional aperture 11 which is located near the outer periphery of said plate. In practice the central aperture 6 of disc 5 is fitted over the hub 3 upon the outer side of a motor vehicle wheel 1 and conventional studs or bolts 7 pass through the apertures 12 of disc 5 it being apparent that the conventional lugs 8 which hold the tire rim in place are pressed firmly against the outer portions of the disc 5 so that the disc 5 is securely clamped with respect to felly 4 by means of nuts 13 and the rim holding lugs 8. In this connection it is to be noted with the air valve which is in communication with the inner tube 10 of the shoe 14, is extended substantially at right angles with respect to felly 4 so that the aperture 11 of disc 5 may be fitted over the said air valve 9. The cap 15' is then fitted to the projected end of the air valve 9 as clearly shown in Figure 2. In positioning the disc 5 it is to be noted that said disc is positioned to the rear of the conventional lugs 8 and the bolts 7 pass through the lugs 8. Thus the same bolts and lugs which are employed to clamp the rim 15 to the felly 4 are employed to clamp the disc or plate 5 with respect to felly 4.

It will be apparent from the foregoing that my disk 5 is composed of a rectilinear sheet which is not dished or otherwise preformed prior to its application to the wheel and that in addition the central opening 6 fits around the wheel hub so that no extraneous fastening devices are employed passing through the central portion of the disc or plate and the wheel hub as has been the case in prior devices of which I am aware. It will be apparent that the discs being of light weight material do not add any appreciable weight to the wooden wheels and yet at the same time give the disc wheel appearance, and also provide for the easy riding qualities of a wooden wheel, which the ordinary disc wheel does not have. By my invention it is only necessary to cut out the disc 5 from a thin flat piece of sheet metal and use only the conventional rim clamping bolts to secure the same in position as is evident.

By the above described arrangement and construction of parts a very simple, efficient and comparatively inexpensive wheel attachment is provided which may readily be applied to any motor vehicle wheel having spokes. In addition to maintaining the motor vehicle clean generally it serves to prevent to a marked degree splashing of mud upon and accumulation of ice and snow between the spokes.

Referring now to Figure 4 the disc 5 is corrugated or provided with a plurality of annular beads or ribs 16 which are arranged concentric with the central aperture 6 in order to stiffen the disc or plate 5.

I am aware that it has been heretofore proposed to enclose the outside and inside of vehicle wheels with plates or discs having notches in their periphery for receiving rim fastening devices, said plates being of special construction and adapted to have coacting internal angular braces common to the inner and outer plates. My invention is differentiated therefrom, since my discs have an unbroken, exterior periphery which fits snugly within the tire rim and the holes in my disc align with the studs, projecting laterally from the felly, so that the same conventional lugs 8, which retain the tire rim in place suffice to secure the outer peripheral portions of my discs in position, after the nuts have been tightened upon said lugs, and to none of the devices of the prior art, do I herein make my claim.

It will now be apparent that I have devised a novel and useful construction of wheel construction for motor vehicles, which embodies the features of advantage enumerated as desirable in the statement of the invention and the above description, and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

In a device of the character stated, a motor vehicle wheel, including a hub, apertured felly and spokes, a rim carrying a tire fitted to said felly, a thin, flat, rectilinear disc having an unbroken, outer periphery fitting within said rim, and circumferentially apertured to register with said felly apertures and centrally apertured for insertion over said hub, annular concentric stiffening ribs formed upon said disc and arranged concentric with said central aperture, bolts passing through said felly and disc for clamping said disc against the outer wall of said felly in perpendicular alignment with said spokes, lugs on the outer ends of said bolts for holding said disk and rim on said felly, and nuts on said bolts, said disc being clamped between said lugs and felly, and being disconnected from said hub.

In testimony whereof, I have hereunto signed my name.

WILLIAM H. RAPEPORT.